(12) United States Patent
Valentine et al.

(10) Patent No.: US 12,318,336 B2
(45) Date of Patent: Jun. 3, 2025

(54) WHEELCHAIR LIFT AND METHODS OF MAKING AND USING THE SAME

(71) Applicant: Levaté LLC, Oklahoma City, OK (US)

(72) Inventors: Zakary Valentine, Wood Village, OR (US); Ethan Van Meter, Owasso, OK (US); Dillon Dakota Carroll, Tulsa, OK (US)

( * ) Notice: Subject to any disclaimer, the term of this patent is extended or adjusted under 35 U.S.C. 154(b) by 344 days.

(21) Appl. No.: 17/394,072

(22) Filed: Aug. 4, 2021

(65) Prior Publication Data
US 2023/0045657 A1    Feb. 9, 2023

(51) Int. Cl.
*A61G 5/10* (2006.01)
*F16M 11/38* (2006.01)

(52) U.S. Cl.
CPC ............ *A61G 5/104* (2013.01); *F16M 11/38* (2013.01)

(58) Field of Classification Search
CPC ....... F16M 2200/063; F16M 2200/048; F16M 2200/047; F16M 2200/04; F16M 11/38; F16M 11/2021; F16M 11/24; A61G 5/014
USPC ............ 248/157, 421, 422, 165, 166, 188.2, 248/188.6, 149, 150, 132, 136, 125.1, 248/125.8, 123, 11, 123.2, 162.1, 404, 248/405
See application file for complete search history.

(56) References Cited

U.S. PATENT DOCUMENTS

| | | | |
|---|---|---|---|
| 4,934,723 A | 6/1990 | Dysarz | |
| 5,180,136 A * | 1/1993 | Sova | F16M 11/24 248/576 |
| 5,501,420 A * | 3/1996 | Watt | F16M 13/00 248/920 |
| 5,613,697 A | 3/1997 | Johnson | |
| 5,857,415 A * | 1/1999 | Richard | A47B 21/0073 108/50.01 |
| 6,029,585 A | 2/2000 | Tabayashi | |

(Continued)

FOREIGN PATENT DOCUMENTS

EP        2758016 B1    7/2014

OTHER PUBLICATIONS

PCT Search Report, Nov. 7, 2022, Valentine, et al.

*Primary Examiner* — Alfred J Wujciak
(74) *Attorney, Agent, or Firm* — Chad Hinrichs PLLC

(57) ABSTRACT

A removably mounted wheelchair lift device that can elevate the wheelchair and its user. The lift device has a novel lifting mechanism which has an upper plate, a lower plate, a knee plate, an upper interior link, an upper exterior link, a lower interior link, a lower exterior link and a transfer link. The various parts of the lifting mechanism are pivotally attached to one another in a manner which provides a linear and precise extension and retraction. Extension and retraction of the lifting mechanism is achieved by a rotary electric motor and gear drive which introduce a torque between adjacent parts of the lifting mechanism. The lifting mechanism maintains a parallel relationship between its top and bottom plates throughout its range of motion. The lift device may also be used in other applications where the level or angle of the equipment or surfaces being supported must remain constant regardless of height. Other applications may include, but are not limited to, supporting hospital beds, medical operation tables, manufacturing work stations, office work stations, pallet stand, and other warehouse and storage applications.

13 Claims, 15 Drawing Sheets

(56) References Cited

U.S. PATENT DOCUMENTS

| | | | |
|---|---|---|---|
| 6,155,642 A * | 12/2000 | Kawakami | A47C 3/38 |
| | | | 248/421 |
| 6,467,785 B2 | 10/2002 | Toppses | |
| 6,641,354 B1 | 11/2003 | Lubrano | |
| 6,851,751 B1 | 2/2005 | Romero | |
| 7,055,840 B1 | 6/2006 | Kelso | |
| 7,090,241 B2 | 8/2006 | Silva | |
| 8,910,326 B2 | 12/2014 | Wilson | |
| 8,973,997 B2 | 3/2015 | Green et al. | |
| 9,033,360 B2 | 5/2015 | Davis et al. | |
| 9,333,132 B2 | 5/2016 | Bruestle et al. | |
| 9,814,309 B2 * | 11/2017 | Kim | A47B 21/02 |
| 2002/0149168 A1 | 10/2002 | Brown | |
| 2006/0054751 A1 | 3/2006 | Johnson et al. | |
| 2008/0048161 A1 | 2/2008 | Meyer | |
| 2011/0174579 A1 | 7/2011 | Zuercher et al. | |
| 2015/0202102 A1 | 7/2015 | Dunham | |
| 2017/0209319 A1 | 7/2017 | Fawcett et al. | |
| 2021/0030147 A1 | 2/2021 | Zhang et al. | |
| 2022/0324685 A1 * | 10/2022 | Yang | F15B 15/14 |

* cited by examiner

SECTION 9-9

WHEELCHAIR LIFT AND METHODS OF MAKING AND USING THE SAME

FIELD OF THE INVENTION

The present invention relates generally to a wheelchair mobility device. More particularly, the present invention relates to a removeable wheelchair lift device which can vertically elevate a wheelchair and its user. Moreover, while the described technology is envisioned for use in lifting a wheelchair, it can also be used for lifting in a broad variety of applications in health care, industrial, and commercial settings.

2. BACKGROUND OF THE INVENTION

People who use manual wheelchairs experience reach-based challenges on a daily basis. They encounter difficult environments in places like the grocery store, gas stations, work places and many other common areas that have not been retrofitted specifically for people who use wheelchairs to operate easily. People who use wheelchairs have adapted to these environments by putting themselves in what are often unsafe situations, like balancing precariously on their wheelchairs to reach a little bit higher. In 2003, more than 100,000 wheelchair-related injuries were treated in emergency departments in the US, double the number reported in 1991. Tips and falls accounted for 65-80% of injuries across all age groups of people who use wheelchairs.

Various lifts lack safety elements such that people who use wheelchairs feel uncomfortable being lifted out of their seat to a high level. The retrolift, for example, lifts users from the seat of their wheelchair up to seventeen (17) inches; this is both uncomfortable and unsafe for people who use wheelchairs. Other wheelchair lift devices are incorporated into the wheelchair itself and allow the users to manually raise themselves to a standing position. A standing device like this requires certain physical abilities to operate; only certain people who use wheelchairs have the muscular capability to support themselves in the upright position of the chair. Additionally, these standing wheelchairs are too heavy and bulky for people who use wheelchairs to transport easily by themselves. After transferring into a vehicle, for example, they cannot get a standing chair into the vehicle after them. Some electrically powered wheelchairs also incorporate lift systems. Such devices seem convenient and easy to use, but such devices are bulky, heavy, and expensive. Furthermore, people who use manual wheelchairs do not want to use powered wheelchairs.

Wheelchair lift systems are typically designed and manufactured to be directly incorporated into the wheelchair's frame, whether manual or electronic. However, these specialized wheelchairs do not allow the person who uses them to remove the lift system when not in use. This aspect is important because the person, when entering or exiting a vehicle for example, must lift the wheelchair into or out of the vehicle after they maneuver themselves into the driver's seat. This process can be difficult when the person is lifting a wheelchair with a substantial amount of weight added on from the lifting system and can result in shoulder injuries.

Thus, a need exists for a more efficient and safe solution to allow users to reach high or out-of-reach objects and remain independent. Therefore, various embodiments of the presently described inventive concepts are directed to an apparatus and methods for making and using such apparatus to allow users to more easily interact in such described environments, to safely restore their reach and sense of independence.

BRIEF SUMMARY OF THE INVENTION

The present invention achieves its objections by providing a removably mounted wheelchair lift device that can elevate the wheelchair and its user. The lift device has a novel lifting mechanism which maintains a parallel relationship between its top and bottom plates throughout its range of motion. The lifting mechanism has an upper plate, a lower plate, a knee plate, an upper interior link, an upper exterior link, a lower interior link, a lower exterior link and a transfer link. The various parts of the lift mechanism are pivotally attached to one another in a manner which provides a linear and precise extension and retraction. Extension and retraction of the lift mechanism is achieved by a battery powered rotary electric motor and gear drive which introduce a torque between adjacent parts of the lift mechanism.

The wheelchair lift device provides a safe solution to the unsafe situations that people who use wheelchairs find themselves in on a daily basis. The lift device aims to empower the people who use it to not only feel independent, but also to actually be independent from needing the help of a caretaker, family member, or any other type of additional aid for height and reach-related issues.

Further, the lift device is designed to allow the person who uses it to add or remove the lift device to the wheelchair without the aid of another person. The person who uses the wheelchair and lift device is empowered to feel more independent and to have control over their daily interactions in un-adapted environments. The lift device aims to make this process easier for the person who uses a wheelchair by giving them the option to add/remove the lift device at their will, any time they please.

The lift mechanism may also be used in other applications to raise and lower equipment and work surfaces. The lift mechanism is readily adaptable for applications where the level or angle of the equipment or surfaces being supported must remain constant regardless of height. Other applications may include, but are not limited to, supporting hospital beds, medical operating tables, manufacturing work stations, construction work stations/platforms, vehicle lift, vehicle loading platform, office work stations, pallet stand, and other warehouse and storage applications.

BRIEF DESCRIPTION OF THE DRAWINGS

Several embodiments of the presently disclosed inventive concepts are hereby illustrated in the appended drawings. It is to be noted however, that the appended drawings only illustrate several typical embodiments and are therefore not intended to be considered limiting of the scope of the presently disclosed inventive concepts.

Further, in the appended drawings, like or identical reference numerals or letters may be used to identify common or similar elements, and not all such elements may be so numbered. The figures are not necessarily to scale, and certain features and certain views of the figures may be shown as exaggerated in scale or in schematic in the interest of clarity and conciseness. Various dimensions shown in the figures are not limited to those shown therein and are only intended to be exemplary.

FIG. 15 is a perspective view of the lift mechanism used in combination with a manufacturing work station, medical operation table office work station, pallet stand or the like.

DETAILED DESCRIPTION OF THE PREFERRED EMBODIMENTS

Figure 1:
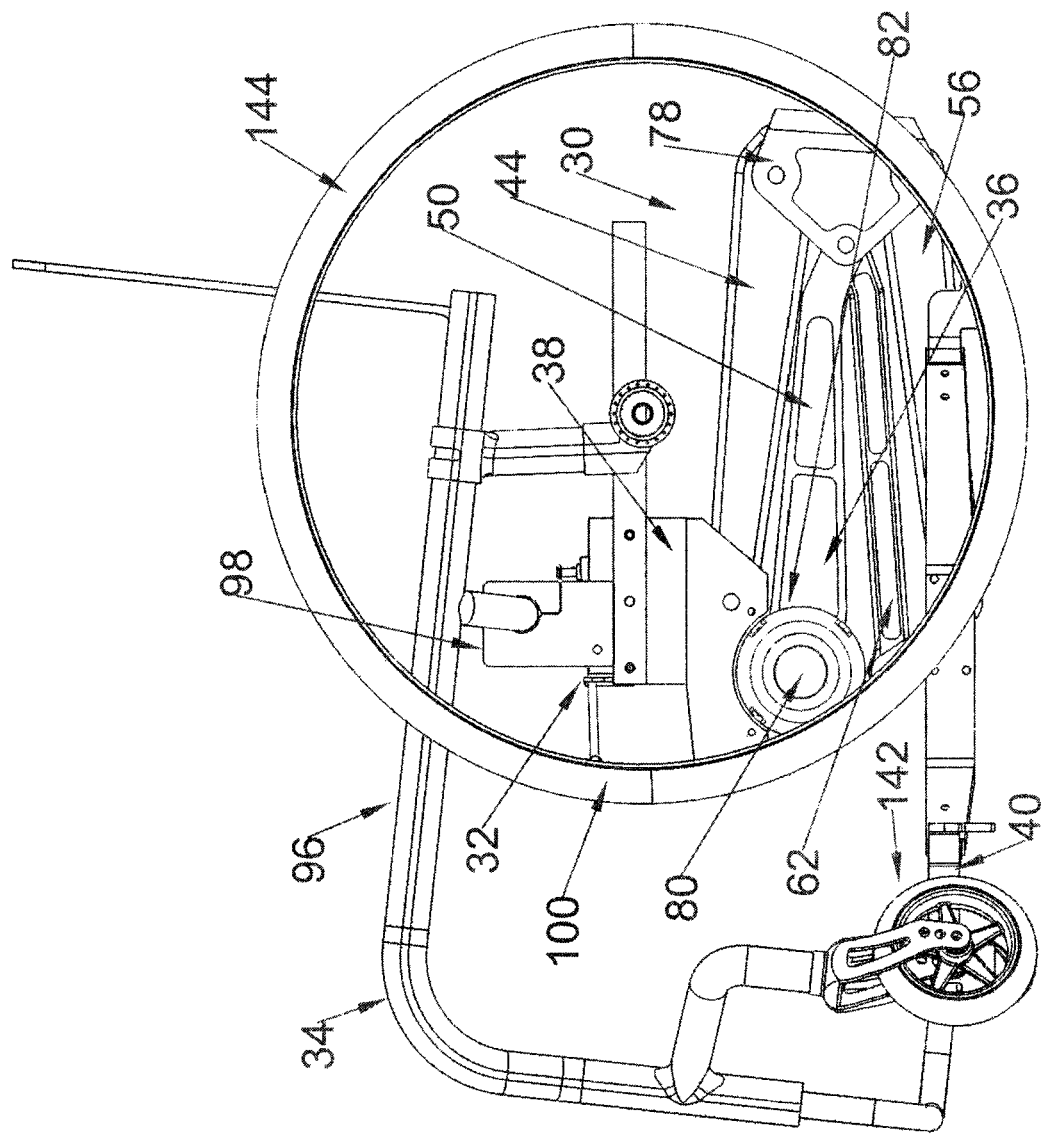
FIG. 1 is a side view of the preferred embodiment of the wheelchair lift device of the present invention in a retracted position and mounted on a wheelchair FIG. 2 a perspective view of the present invention in an extended position mounted on a wheelchair.

Before describing various embodiments of the presently disclosed inventive concepts in more detail by way of exemplary descriptions, examples, and results, it is to be understood that the presently disclosed inventive concepts are not limited in application to the details of systems, methods, and compositions as set forth in the following description. The presently disclosed inventive concepts are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description.

Unless otherwise defined herein, scientific and technical terms used in connection with the presently disclosed inventive concepts shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the concepts of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims and/or the specification is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one. In addition, the use of the term "at least one of X, Y and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

FIG. 1 provides a perspective view of the wheelchair lift device 30 mounted on a wheelchair 34. It has a latching mechanism 32 which is secured to the bottom of a wheelchair 34. A lifting mechanism 36 with a receiver 38 attached to the upper portion and a foot 40 attached to the lower portion. The lifting device 30 can be removable secured to a wheelchair 34 through the interconnection of the latching mechanism 32 and the receiver 38 which is mounted to the top of the lifting mechanism 36.

Figure 2:
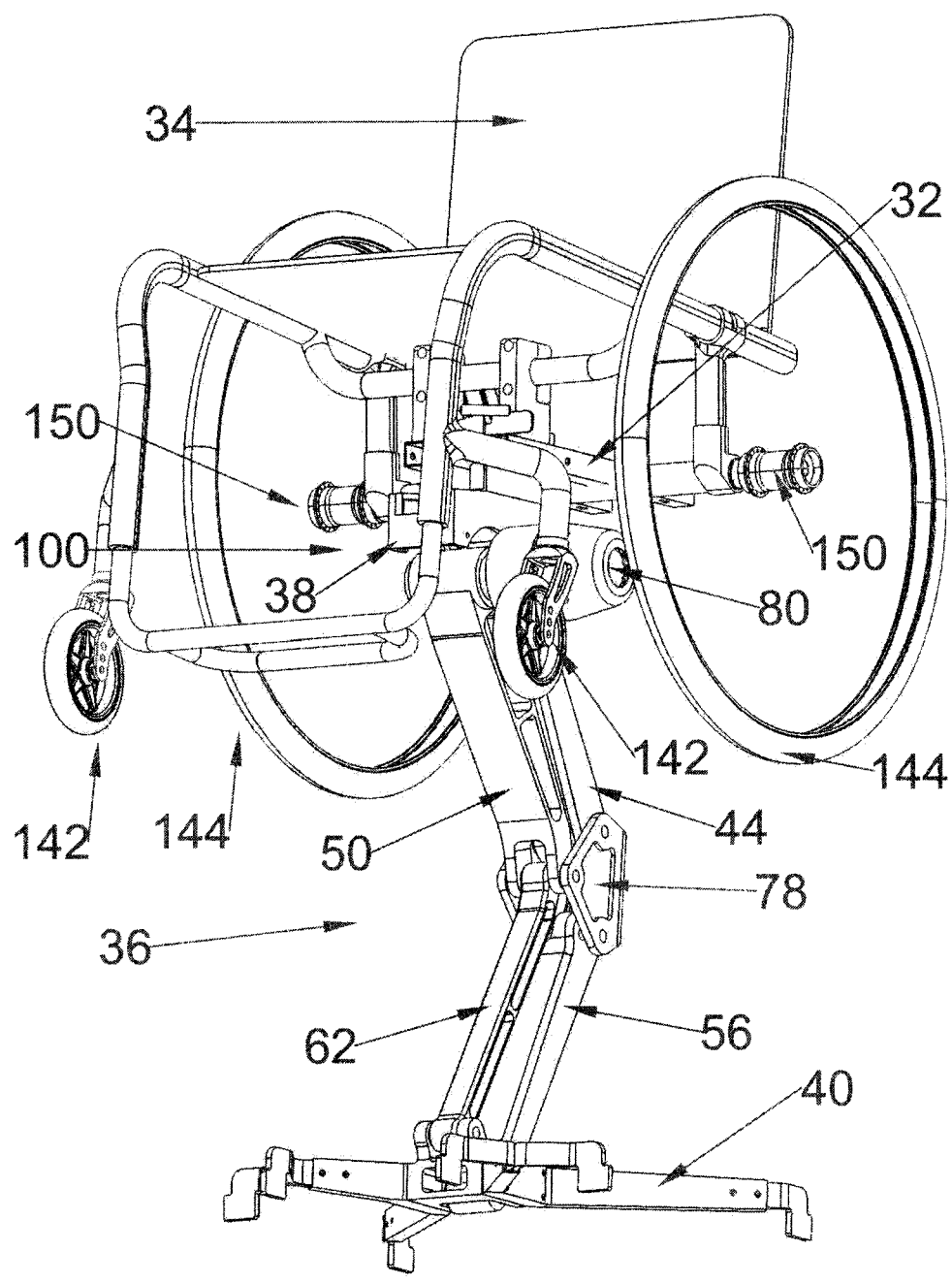
Figure 3:
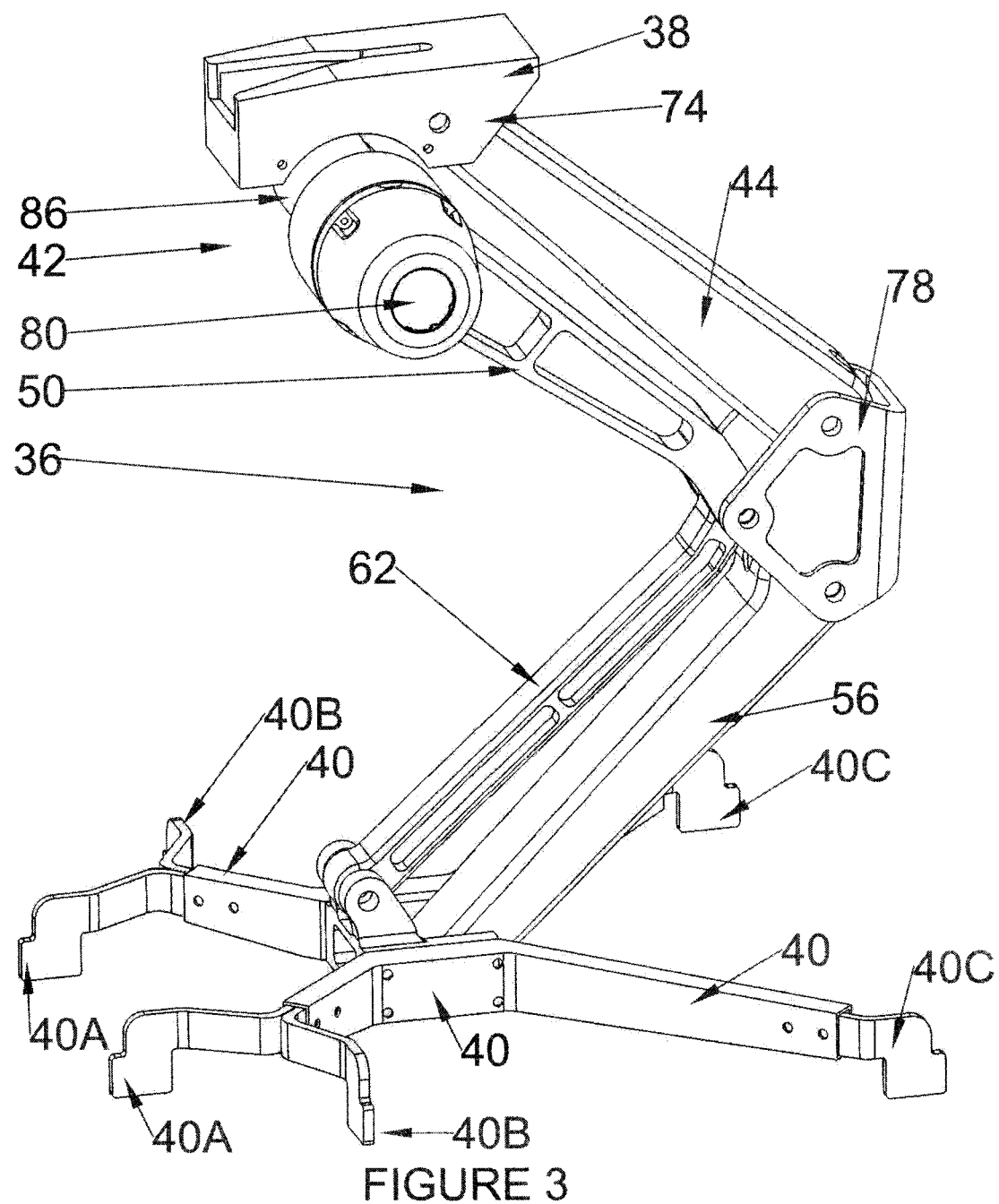
FIG. 3 is a perspective view of the present invention in an extended position.

FIG. 2 shows the wheelchair lift device lift device 30 mounted on a wheelchair and the lifting mechanism 36 in an extended or up position. FIG. 3 shows the lifting mechanism 36 by itself in an extended position.

Figure 4:
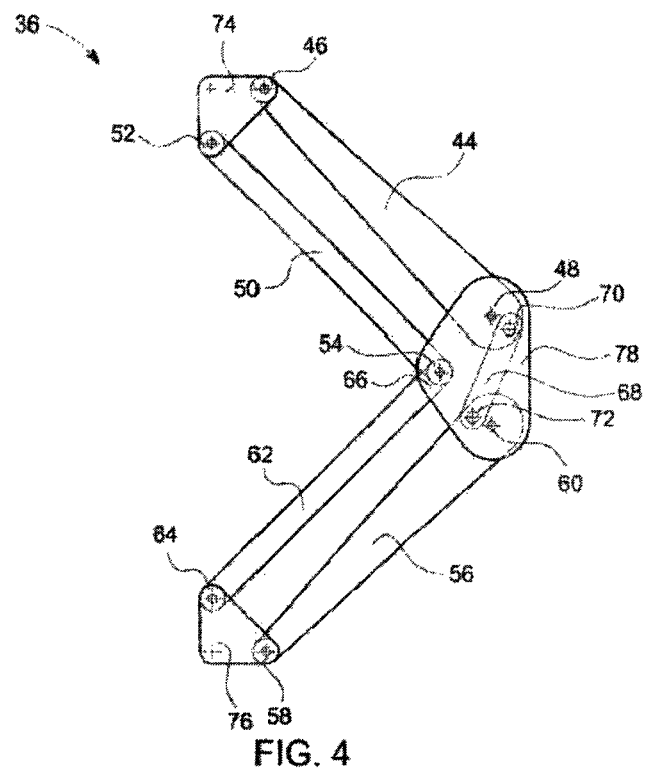
FIG. 4 is a two dimensional schematic view of the preferred embodiment of the lifting mechanism of the present invention extended to 90°.
Figure 5:
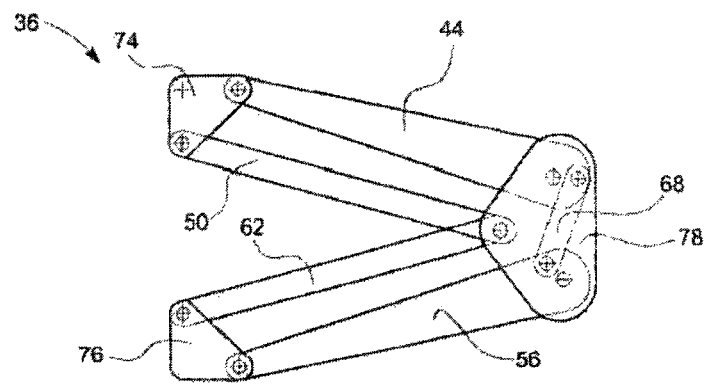
FIG. 5 is a two dimensional schematic view of the lifting mechanism extended to 30°.
Figure 6:
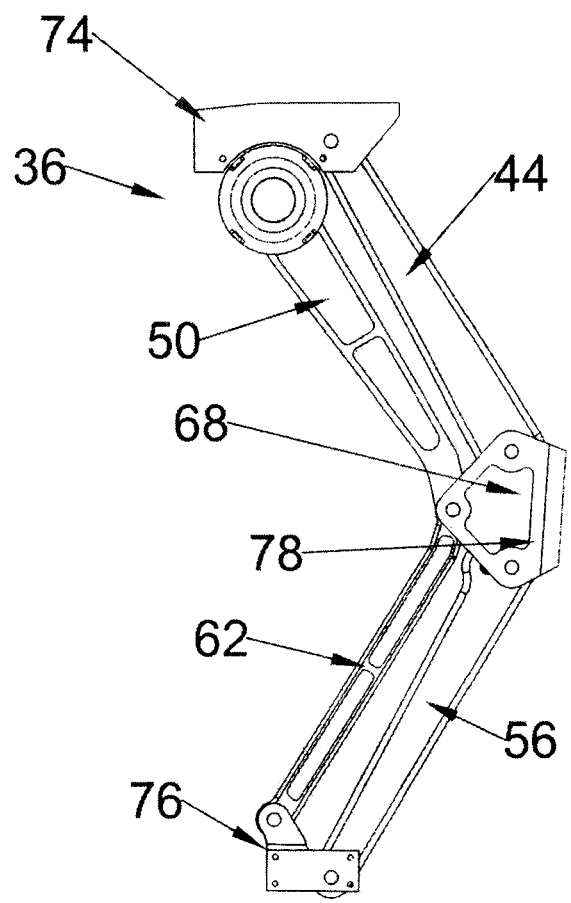
FIG. 6 is a two-dimensional schematic view of the lifting mechanism extended to 120°.
Figure 6A:
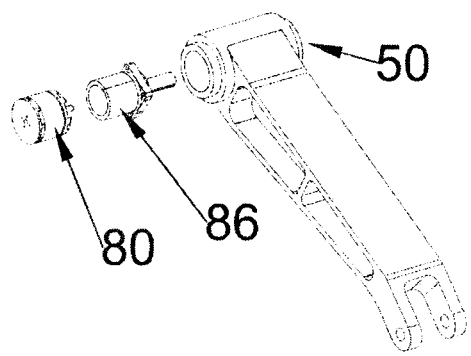
FIG. 6A is an exploded view of the rotary electric motor and gear drive mounted on the upper interior link.

FIG. 4 is a two dimensional schematic view of the lifting mechanism 36 without the receiver 38, foot 40 and torque mechanism 42. FIG. 5 provides a view of the schematic from FIG. 4 in a retracted position. While FIG. 6 shows it in an extended position with splines for a torque input mechanism, 42. The lifting mechanism 36 is comprised of a plurality of links. The naming conventions of the various parts of the lifting mechanism 36 are based on the lifting mechanism 36 shown in FIG. 4. That is, while in the lowered position certain links are internal while others are external to the lifting mechanism 36. The lifting mechanism 36 has an upper exterior link 44 with a first end 46 and second end 48, an upper interior link 50 with a first end 52 and a second end 54, a lower exterior link 56 with a first end 58 and a second end 60, a lower interior link 62 with a first end 64 and a second end 66, a transfer link 68 with a first end 70 and a second end 72, an upper plate 74, a lower plate 76, a knee plate 78 and a torque mechanism 42.

The first end 46 of the upper exterior link 44 and the first end 52 of the upper interior link 50 are pivotally attached to the upper plate 74. The second end 48 of the upper exterior link 44 and the second end 54 of the upper interior link 50 are pivotally attached to the knee plate 78. The first end 58 of the lower exterior link 56 and the first end 64 of the lower interior link 62 are pivotally attached to the lower plate 76. The second end 60 of the lower exterior link 56 and the second end 66 of the lower interior link 62 are pivotally attached to the knee plate 78. The first end 70 of the transfer link 68 is pivotally attached to the second end 48 of the upper exterior link 44. The second end 72 of the transfer link 68 is pivotally attached to the second end 60 of the lower exterior link 56. These connections are illustrated in a two dimensional form FIGS. 2, 3 and 4.

Movement in one of the upper links 44 or 50 relative to one of the upper plate 74 or knee plate 78 produces an equal linear and angular movement of the lower links 56 and 62. Likewise, movement in one of the lower links 56 or 62 relative to the lower plate 76 or knee plate 78 produces an equal linear and rotational movement of the upper links 44 and 50. This action ensures the receiver 38 mounted to the top plate 74 and the foot 40 mounted to the lower plate 76, if they are initially parallel with one another, will remain parallel with one another throughout the extension and retraction of the lifting mechanism 36. This is necessary to ensure safe operation of the wheelchair lift device 30.

Extension and retraction of the lifting mechanism is achieved by introducing torque between one of the plates 74, 76 or 78 and one of their adjacent and pivotally attached links 44, 50, 56 or 62.

The torque mechanism 42 can be mounted such that it creates a torque between one of the plates 74, 76 or 78 and one of the respective interior or exterior links 44, 50, 56 or 62 which is pivotally connected to said plates 74, 76 or 78. In the preferred embodiment the torque mechanism 42 is attached to the upper plate 74 and creates a torque between the upper plate 74 and the upper interior link 50.

Figure 7:
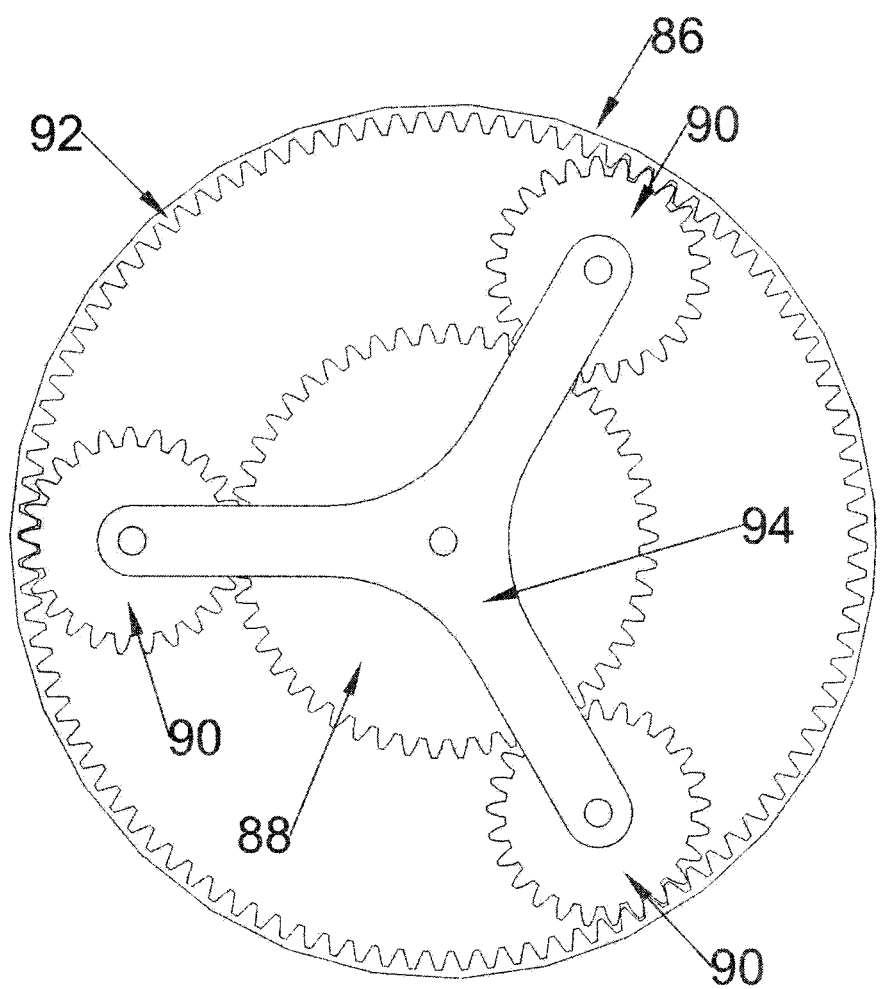
FIG. 7 is a two-dimensional schematic view of a planetary gear drive for use in the present invention.

In the preferred embodiment the torque mechanism 42 is comprised of a rotary electric motor 80 powered by an electric battery 82 and a gear drive 86. While this can be any gear drive, in the preferred embodiment the gear drive 86 is a planetary gear drive with a sun gear 88, driving one or more planetary gears 90 against a ring gear 92. The planetary gears 90 are carried in a planet carrier 94. FIG. 7 provides a schematic of a typical planetary gear drive 86 that can be used in the present invention. The gear drive 86 may contain a single stage or two or more stages, i.e., a single planetary gear set or 2 or more planetary gear sets. While the drawings show a planetary gear drive 86, other embodiments could use other types of gear reductions in its place, including, but not limited to, cycloidal, harmonic and worm gear drives.

In this configuration the sun gear 88 is coupled directly to the drive shaft 84 of the motor 80. The ring gear 92 is coupled to the upper plate 74. One of the upper links 44 or 50 is coupled to motor. As the motor 80 runs, the gear drive 86 transfers torque between the upper plate 74 and one of the upper links 44 or 50. This causes the lifting mechanism 36 to extend or retract. The planetary gear drive 86 provides a mechanical advantage for the motor 80 to multiply the amount of torque generated by the motor 80. This allows a smaller motor 80 to increase its lifting capacity.

Figure 8:
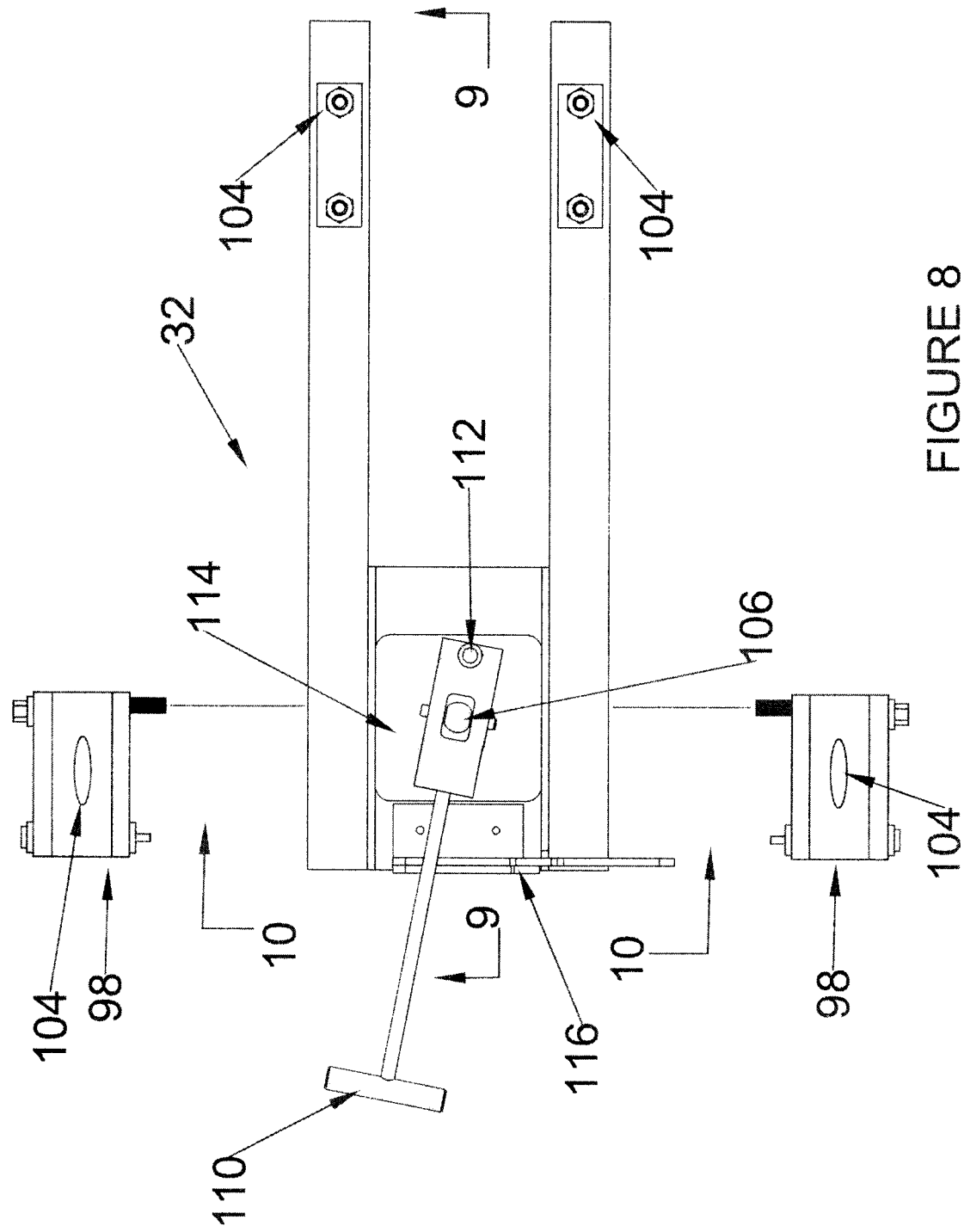
FIG. 8 is a top view (when mounted on a wheelchair) of the manual embodiment of the latching mechanism used in the present invention.
Figure 9:
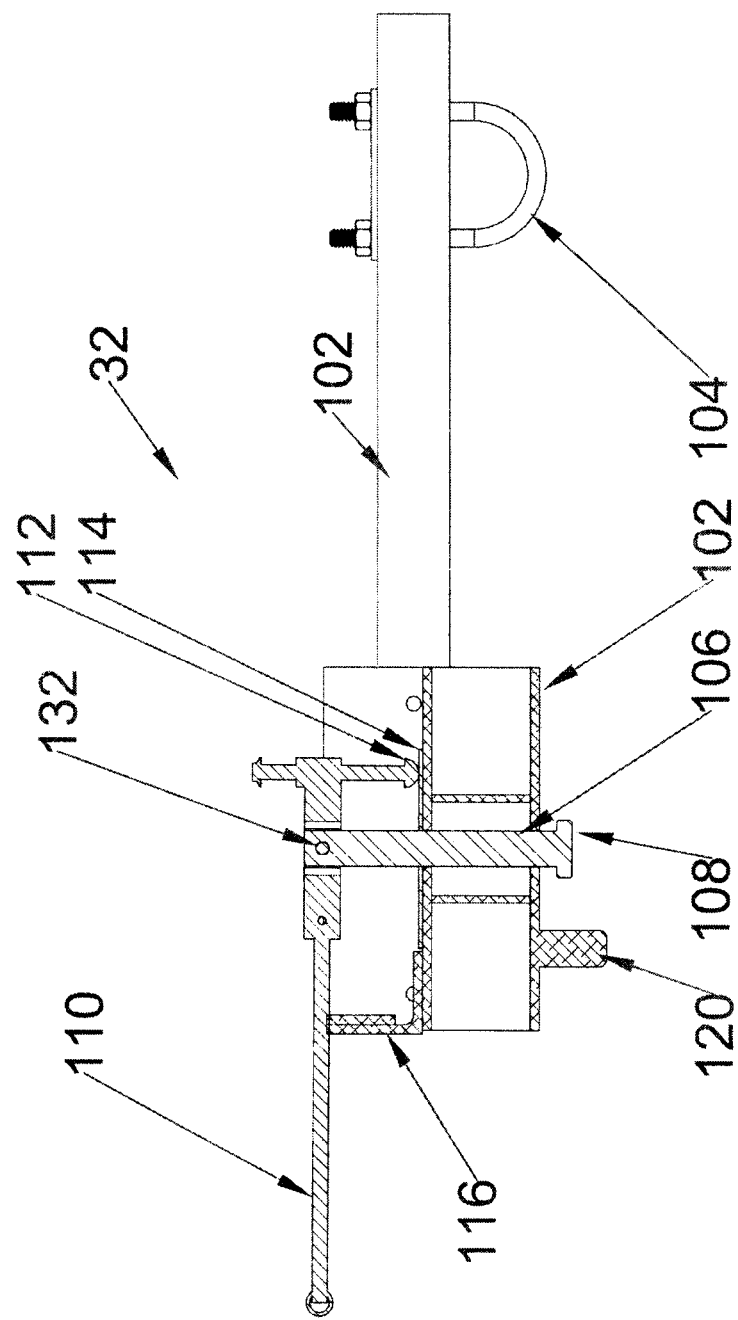
FIG. 9 is a cross-section of the manual embodiment of the latching mechanism shown in FIG. 8 taken along line 9-9.
Figure 10:
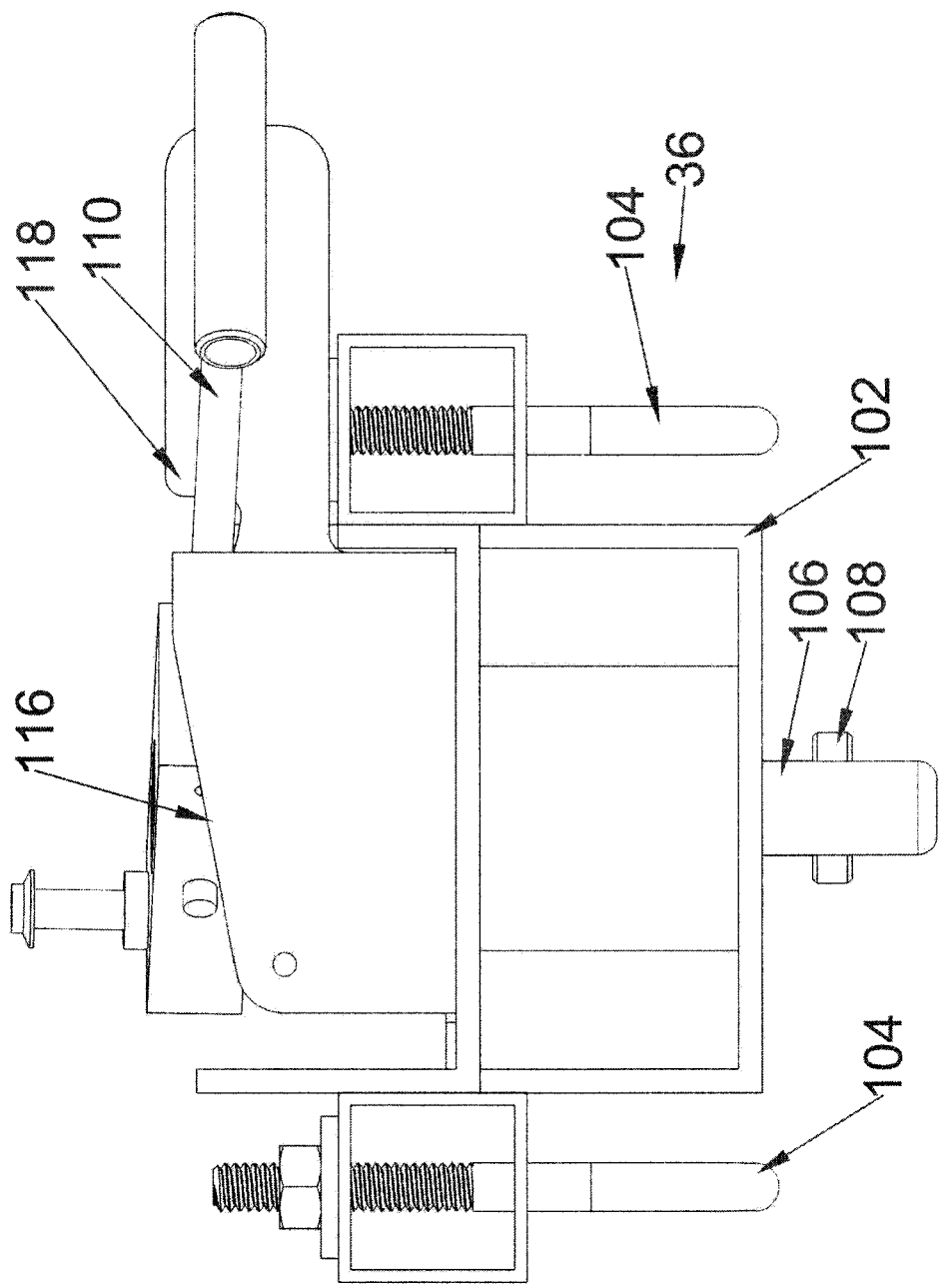
FIG. 10 is a cross-section of the manual embodiment of the latching mechanism shown in FIG. 8 taken along line 10-10.
Figure 11:
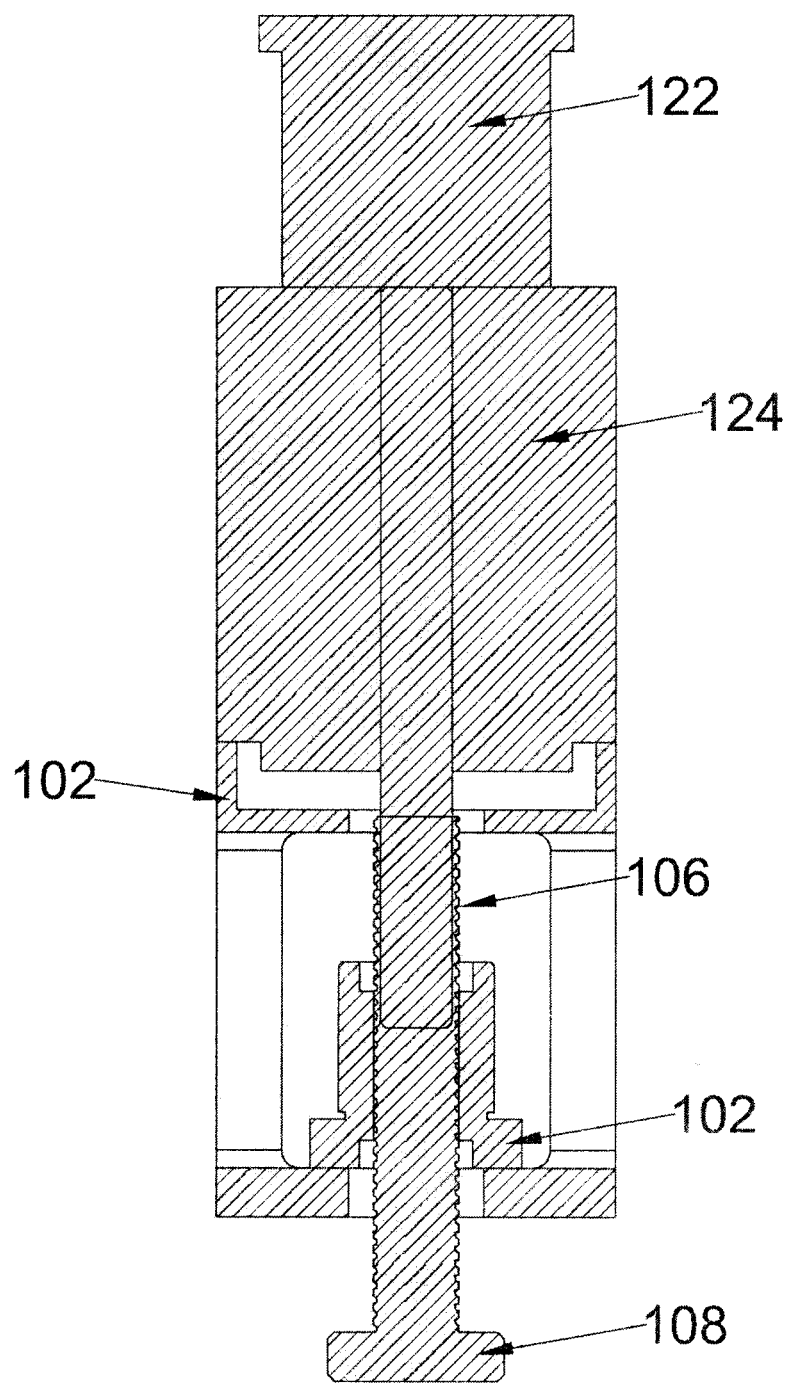
FIG. 11 is a cross-section of the automated embodiment of the latching mechanism used in the present invention.

In the preferred embodiment the lift 30 can be removed and attached to the wheelchair 34 by the user sitting in the wheelchair 34 through operation of the docking mechanism 100. The docking mechanism 100 has a latching mechanism 32 mounted to the wheelchair 34 and a receiver 38 attached to the upper plate 74 of the lift mechanism 36. A manual version of the latching mechanism 32 is shown in FIGS. 8, 9 and 10. An automated version of the latching mechanism 32 is shown in FIG. 11.

The latching mechanism 32 has a body 102 which can be secured to the axle or other structural member of the wheelchair 34 by one or more brackets 104. FIGS. 8 and 9 show the brackets 104 as a pair of U-bolts which pass through the body 102. A second pair of brackets 104 or U-bolts pass through an arm 98 which extends from and are attached to the body 102. The arms 98 and their brackets 104 are mounted on opposing sides of the body 102 However, the brackets 104 can be various other geometries and still fall within the scope of this invention.

The latching mechanism 32 also has a kingpin 106 with a head 108. The kingpin 106 rotates and travels linearly relative to the body 102. A lever 110 is pivotally mounted to the kingpin 106, such that it pivots relative to the kingpin 106 on an axis which is perpendicular to axis of rotation of the kingpin 106.

The lever 110 has a ball 112 which moves along a hardened surface 114 on the body 102 as the lever 110 is rotated. As the lever 110 is rotated it also travels along a ramp 116 on the body 102 which causes the lever 110 to raise the kingpin 106 relative to the body 102 of the latching mechanism 32. The ramp 116 and the ball 112 are on opposing sides of the lever's 110 pivot point with the kingpin 106. The lever 110 can be secured in this raised position by a latch 118 on the ramp 116. This in turn secures the kingpin 106 in a raised position. The dock has one or more anti-rotation pins 120 which aligns the wheelchair 34 parallel to the lift mechanism 30 during docking and prevents rotation of the latching mechanism 32 relative to the receiver 38 when the two are engaged.

In another embodiment the invention the latching mechanism 32 may be automated as seen in the cross section view of FIG. 11. Here the latching mechanism 32 has a kingpin 106 with a head 108. The kingpin 106 is threadedly engaged with the body 102 of the latching mechanism 32. Operation of the motor 122 rotates a threaded kingpin 106 against a stationary and unattached body 102. Rotation of the kingpin 106 causes linear movement of the kingpin 106 relative to the body 102 of the latching mechanism 32 due to the threaded engagement of these two parts.

Depending upon the application it may be beneficial to use a gear drive 124 such as the planetary gear drive shown in FIG. 11 to provide a mechanical advantage to the motor 122 in rotating the kingpin 106 and moving it linearly relative to the body 102 of the latching mechanism 32. The automated latching mechanism 32 shown in FIG. 11 replaces the lever 110 and ramp 116 arrangement shown in FIGS. 8 through 10.

Figure 12:
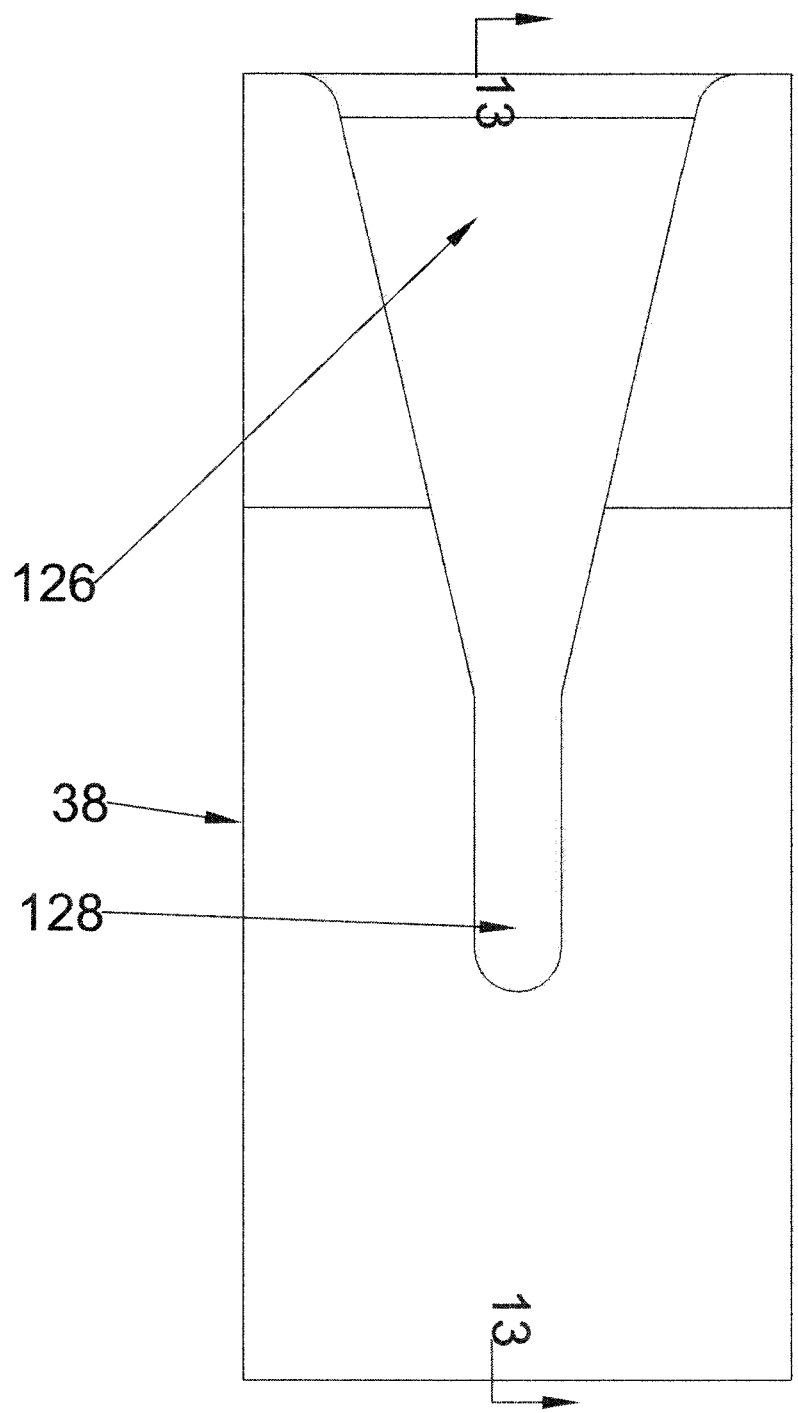
FIG. 12 is a bottom view (when mounted on a lift mechanism) of the preferred embodiment of the receiver used in the present invention.
Figure 13:
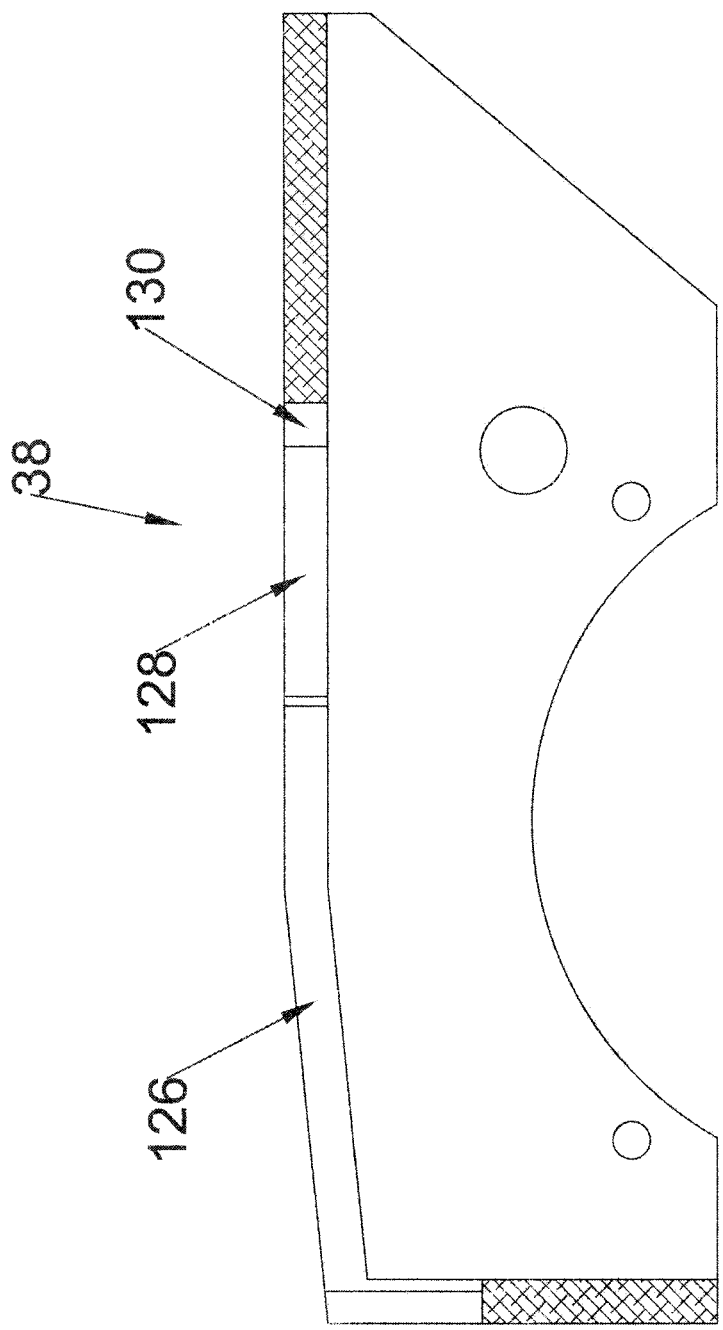
FIG. 13 is a cross-section of the receiver shown in FIG. 12 taken along line A-A.

The other half of the docking mechanism 100 is the receiver 38 as seen in FIGS. 12 and 13. The receiver is secured to the upper plate 74 of the lift mechanism 36. The receiver 38 has a Y-shaped opening 126 which ends in a channel 128 sized to receive the kingpin 106. The end of the channel 128 may have an undercut 130 sized to receive and hold the head 108 of the kingpin 106.

The latching mechanism 32 can be docked with the receiver by sliding the kingpin 106 and anti-rotation pins 120 into the Y-shaped opening 126 until the kingpin 106 hits the end of the channel 128. At this point the kingpin 106 is retracted towards the body 102 of the latching mechanism. This can occur through movement of the lever 110 in the manual embodiment (FIGS. 8 through 11) or through operation of the motor 122 in the automated embodiment (FIG. 11). The kingpin 106 is raised until the head 108 of the kingpin 106 exerts a locking pressure on the receiver adjacent to the channel 128. In the preferred embodiment the head 108 of the kingpin 106 exerts a locking pressure on the undercut 130 at the end of the channel. If using the manual embodiment of the latching mechanism 32, accidental undocking can be prevented by holding the lever 110 in place with the latch 118.

In the preferred embodiment of the docking mechanism 100, the anti-rotation pin(s) 120 on the body 102 of the latching mechanism 32 are in contact with the side(s) of the Y-shaped opening 126 of the receiver 38 when the kingpin 106 is in contact with the end of the channel 128. The contact between the anti-rotation pin(s) 120 and the side(s) of the Y-shaped opening 126 prevent rotation of the latching mechanism 32 relative to the receiver 38. This also prevents rotation of the wheelchair lifting device 30 relative to the wheelchair 34.

The user initiates docking the lift mechanism 32 to the wheel chair 34 by backing the wheel chair 34 towards the lift 30. The user guides the king pin 106 into the Y-shaped opening 126. The Y-shaped opening 126 helps center the wheel chair 34 to the docking mechanism 100. As the user continues to reverse the wheel chair 34, the king pin 106 engages the opening 126. The anti-rotations pins 120 engage with the sides of the Y-shaped opening 126. The anti-rotation pins 120 serve two functions 1.) to align the lift 30 parallel to the wheel chair's 34 direction of travel; and 2.) prevent rotation of the lift 30 when it is raised to the stowed position under the wheel chair 34.

Figure 14:
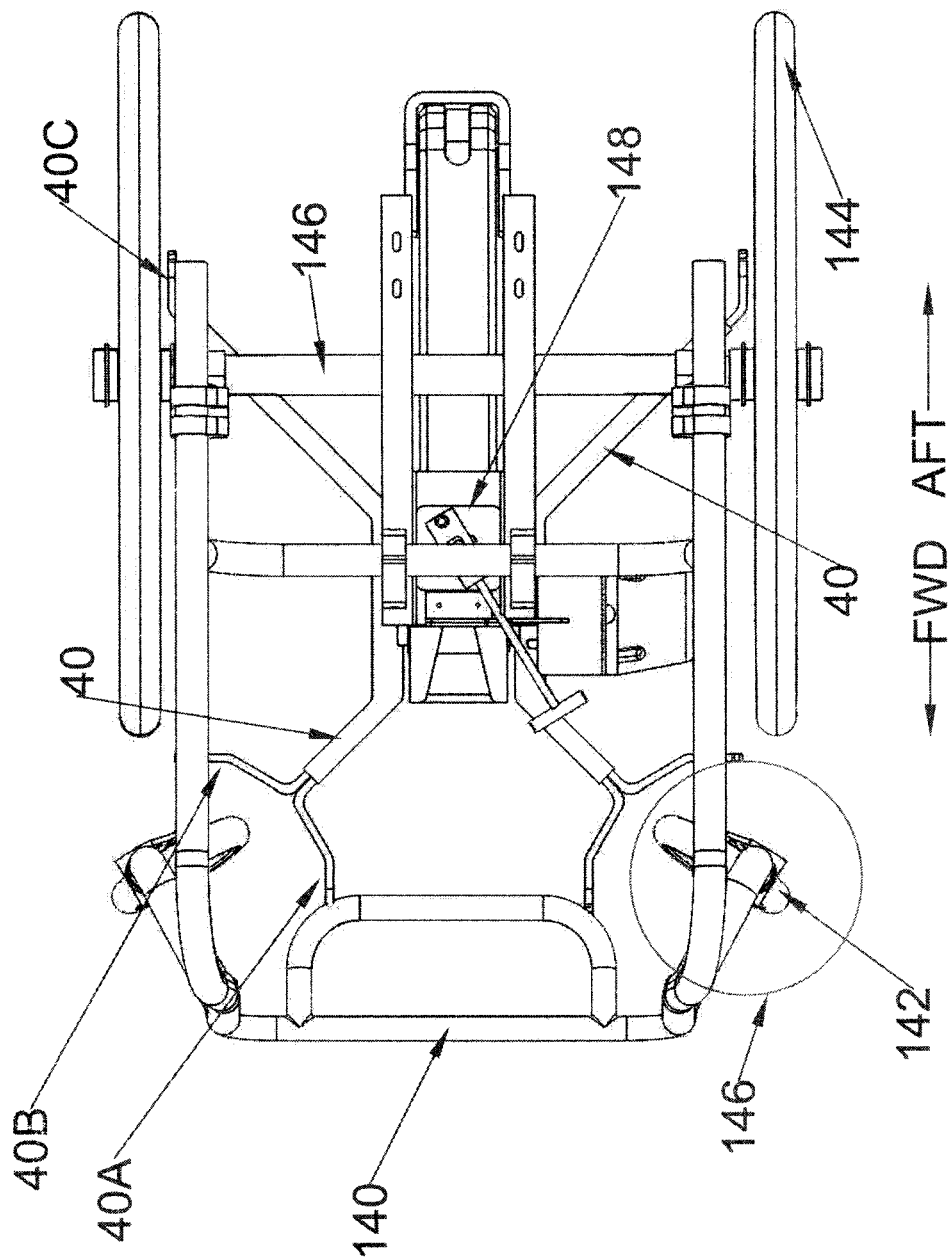
FIG. 14 is a top view of the present invention mounted on a wheelchair with the seat removed to show details of the docking mechanism and foot.
Figure 15:
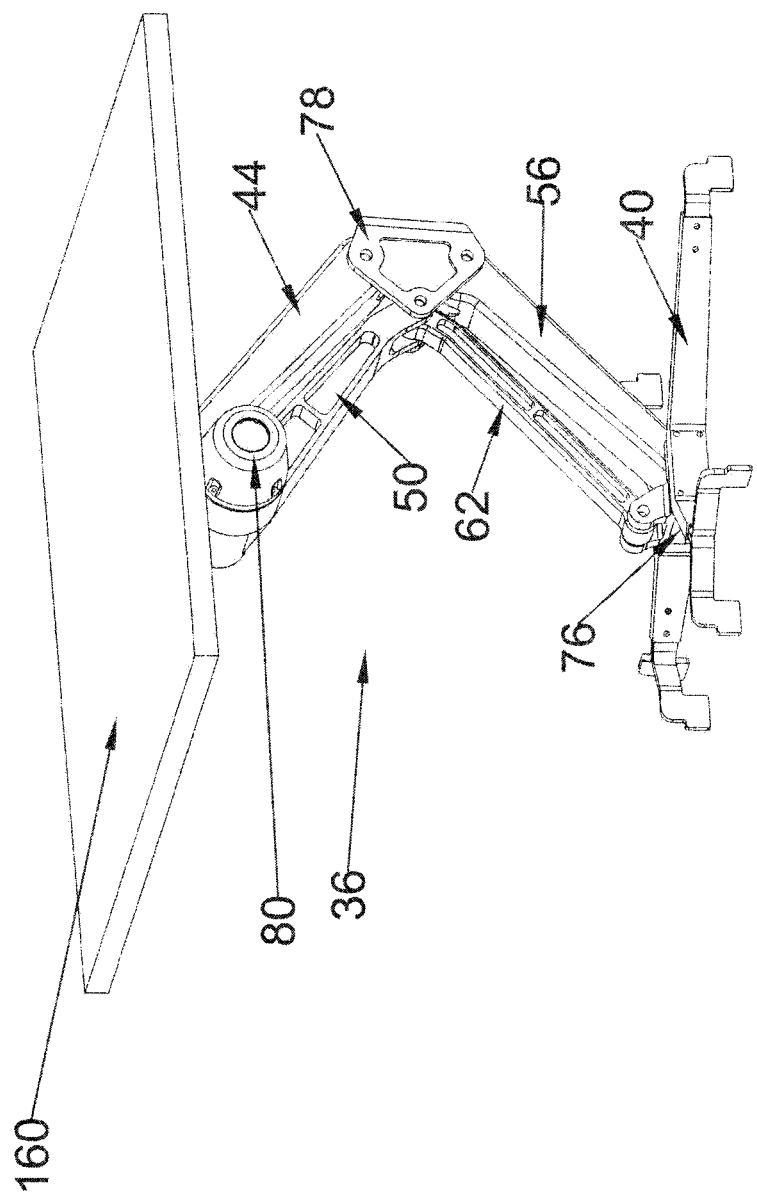
Figure 16:
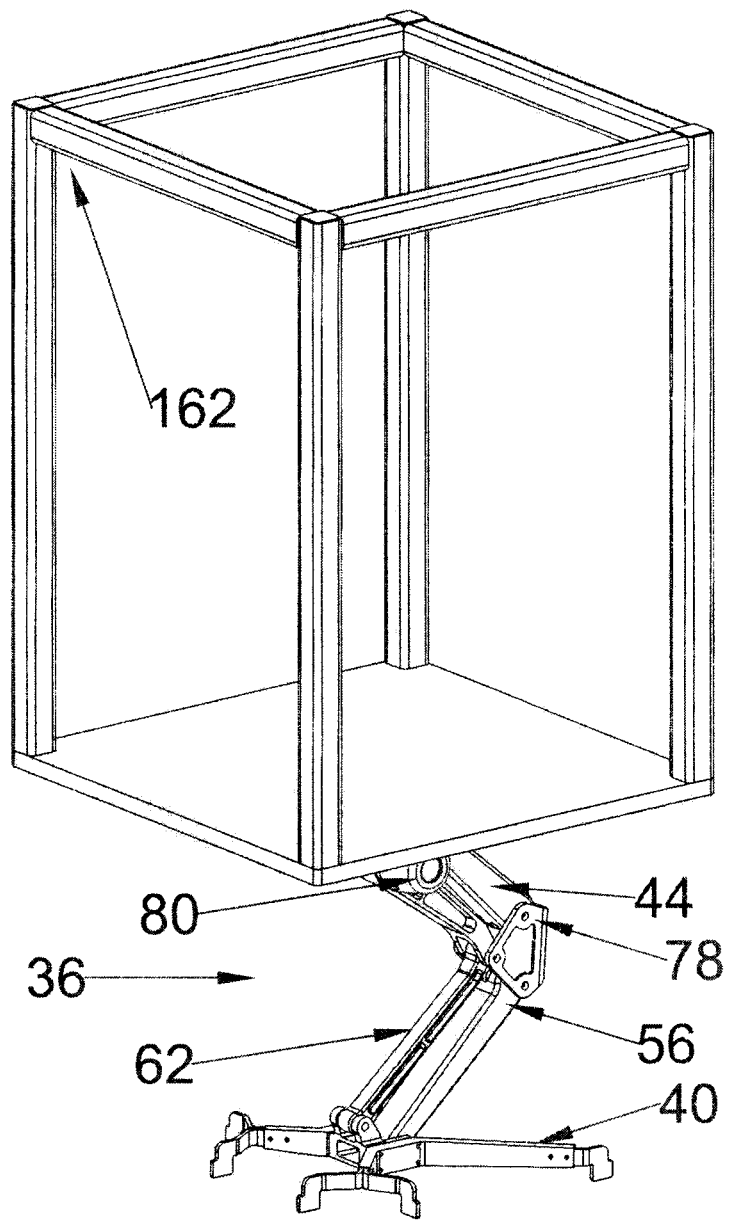
FIG. 16 is a perspective view of the lift mechanism of the present invention used in combination with construction equipment such as a manlift.

Turning now to FIG. 14 is a bottom view of the wheel chair 34 with the lift 30 attached. A foot 40 is attached to the lower plate 76. The foot 40 is initially adjusted to be parallel with the receiver 38. Once aligned the receiver 38 and foot 40 remain parallel or at a preset angle with one another throughout the full range of motion of the lifting mechanism 36

The preferred embodiment of the foot 40, as seen in FIG. 14, increases the stability of the lift 30 by extending three pair of ground contact points 40A, 40B and 40C as far as practicably possible. The ground contact points are symmetrical between the left- and right-hand sides of the wheel chair 34. The wheel chair casters 142 swing in an arc represented by the dashed keep out 146. The pivot centers of the casters 142 are located at the centers of the caster keep outs 146. The floorboard 140 presents an obstacle to the lift 30. The direction of forward and aft are indicated in FIG. 14.

The first pair of contact points 40A resides forward of the caster pivot center and between the floorboard 140 and the keep out 146 of the caster 142. It is located equidistant to the distance between the axle 150 and the center of gravity 148 of the wheel chair 30. This distributes contact load evenly.

The second pair of contact points 40B are located between the castors 142 and the center of gravity 148 of the wheel chair 34, preferably outboard of the casters 142 to increase lateral stability when lifted. The third pair of contact points 40C are located aft of the wheel chair's center of gravity 148 and preferably aft of the axle 150 of the wheel chair 34.

The control panel 96 used by the user to control the actuation need not be hardwired to the wheelchair lift device 30. A wireless connection from the control panel 96 could be achieved via Bluetooth wireless technology, which may include substantively new Bluetooth protocols. The wireless communication need not be strictly utilizing a physical control panel 96 but may also utilize an accompanying software application intended for deployment on commercially available "smart-phones" and other control devices. It is also to be understood that due to the wireless nature of this connection it could substantially alter and improve the attachment of the lift device 30 to the wheelchair 34 in a novel and non-obvious way. This includes but is not limited to the user rolling the wheelchair 34 over the undeployed and unattached lift device 30, or otherwise placing it in some fashion beneath their wheelchair 34, and engaging a particular command via the wireless control panel 96 (in whatever form that control panel takes) such that the lift device 30 actuates only to the point of making contact with the attachment points on the wheelchair 34 such that in some form the lift device 30 is automatically or semi-automatically attaching the receiver 38 to the latching mechanism 32 on the wheelchair 34. That is, the wireless control panel 96 allows for the non-manual or semi-non-manual (semi-automatic) attachment of the lift device 30 to the wheelchair 34, reducing the steps and complexity required by the user to attach the lift device 30 to their wheelchair 34.

It should be appreciated, that while the present invention has been described in terms of a lift for a wheelchair 34 portions of the invention may be used for other applications. One example of this is the lift mechanism 36 may be used in other applications where the level or angle of the equipment or surfaces being supported must remain constant regardless of height. Other applications may include, but are not limited to, supporting hospital beds, medical operation tables, manufacturing work stations 160 office work stations, pallet stand, construction equipment 162 industrial and other warehouse and storage applications. Moreover, while the described technology is envisioned for use in lifting a wheelchair, it can also be used for lifting in a broad variety of applications in health care, industrial, and commercial settings.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A lift device comprising:
   An upper exterior link with a first and second end;
   An upper interior link with a first and second end;
   A lower exterior link with a first and second end;
   A lower interior link with a first and second end;
   A transfer link with a first and second end and attached at only two points; and
   An upper plate;
   a lower plate;
   a knee plate; and
   a torque mechanism for extending and retracting the device;

wherein the first end of the upper exterior link and the first end of the upper interior link are pivotally attached to the upper plate, the second end of the upper exterior link and the second end of the upper interior link are pivotally attached to the knee plate, the first end of the lower exterior link and the first end of the lower interior link are pivotally attached to the lower plate, the second end of the lower exterior link and the second end of the lower interior link are pivotally attached to the knee plate, the first end of the transfer link is pivotally attached to the second end of the upper exterior link and the second end of the transfer link is pivotally attached to the second end of the lower exterior link.

2. The lift device of claim 1 further comprising:
the second end of the upper interior link being pivotally attached to the second end of the lower interior link.

3. The lift device of claim 1 further comprising:
A torque mechanism having an electric battery, an electric rotary drive; and a gear train;
wherein the battery provides power to the electric rotary drive to induce torque in the gear train.

4. The lift device of claim 3, wherein the torque mechanism creates torque between the upper plate and one of the links from the group consisting of: the upper exterior link and the upper interior link.

5. The lift device of claim 3, wherein the torque mechanism creates torque between the upper plate and the upper interior link.

6. The lift device of claim 3, wherein the torque mechanism creates torque between the lower plate and one of the links from the group consisting of: the lower exterior link and the lower interior link.

7. The lift device of claim 3, wherein the torque mechanism creates torque between the lower plate and the lower interior link.

8. The lift device of claim 3, wherein the torque mechanism creates torque between the knee plate and one of the links from the group consisting of: the upper exterior link, the upper interior link, the lower exterior link and the lower interior link.

9. The gear train of claim 3 further comprising:
a planetary gear system.

10. The lift device of claim 1 further comprising:
A foot mounted to the lower plate.

11. The lift device of claim 10, the foot comprising:
a footprint with three pair of ground contact points symmetrical between a left and right side of a wheel chair, each side of the wheel chair having a main wheel and a front caster pivoting about a point, the wheel chair also having a floor board located between the front casters and a center of gravity,
a first pair of contact points are located on opposing sides of the floor board and between the floor board and the castors,
a second pair of contact points are each located between the center of gravity and the caster,
a third pair of contact points are located aft of the center of gravity.

12. The lift device of claim 11 further comprising
the second pair of contact points each being located outboard of the caster pivot point.

13. The lift device of claim 1 further comprising:
A docking system, the docking system comprising a latching mechanism affixed to a wheelchair, and a receiver mounted to the upper plate of the lift device;
wherein the latching mechanism and receiver removeable interconnect such that the lifting system can lift the wheelchair.

* * * * *